United States Patent
Mettath et al.

(10) Patent No.: US 8,193,124 B2
(45) Date of Patent: Jun. 5, 2012

(54) EMULSIFIER FREE OIL-BASED WELLBORE FLUID

(75) Inventors: Sashikumar Mettath, Houston, TX (US); Steven Young, Cypress, TX (US)

(73) Assignee: M-I L.L.C., Houston, TX (US)

( * ) Notice: Subject to any disclaimer, the term of this patent is extended or adjusted under 35 U.S.C. 154(b) by 30 days.

(21) Appl. No.: 12/863,681

(22) PCT Filed: Jan. 22, 2009

(86) PCT No.: PCT/US2009/031662
§ 371 (c)(1), (2), (4) Date: Jul. 20, 2010

(87) PCT Pub. No.: WO2009/094425
PCT Pub. Date: Jul. 30, 2009

(65) Prior Publication Data
US 2010/0311619 A1   Dec. 9, 2010

Related U.S. Application Data

(60) Provisional application No. 61/022,705, filed on Jan. 22, 2008.

(51) Int. Cl.
*C09K 8/02* (2006.01)
*C09K 8/68* (2006.01)
*B01F 17/00* (2006.01)
*E21B 7/00* (2006.01)

(52) U.S. Cl. ............ 507/127; 175/57; 175/65; 507/103; 507/117; 507/119; 507/120; 507/125; 507/140; 507/203; 507/219; 507/221; 507/224; 507/225; 507/223; 507/234; 507/269; 507/901; 507/904; 507/910

(58) Field of Classification Search ............... 507/127, 507/103, 117, 119, 120, 125, 140, 203, 219, 507/221, 224, 225, 223, 234, 269, 901, 904, 507/910; 175/57, 65
See application file for complete search history.

(56) References Cited

U.S. PATENT DOCUMENTS

| | | |
|---|---|---|
| 4,528,104 A | 7/1985 | House et al. |
| 4,618,631 A | 10/1986 | Takeda et al. |
| 4,698,404 A | 10/1987 | Cramm et al. |
| 4,755,560 A | 7/1988 | Ito et al. |
| 5,376,629 A | 12/1994 | Smith |
| 6,222,091 B1 | 4/2001 | Beihoffer et al. |
| 6,376,072 B1 | 4/2002 | Evans et al. |
| 6,750,262 B1 | 6/2004 | Hahnle et al. |
| 2005/0202977 A1 | 9/2005 | Shumway et al. |
| 2005/0202978 A1 | 9/2005 | Shumway |

FOREIGN PATENT DOCUMENTS

| | | |
|---|---|---|
| GB | 1598140 A | 6/1981 |
| GB | 2247479 A | 3/1992 |
| WO | 2006/056774 A2 | 6/2006 |

OTHER PUBLICATIONS

International Search Report from PCT/US2009/031662 dated Aug. 28, 2009 (2 pages).
Search Report issued in corresponding European Application No. 09703788.1 dated Nov. 10, 2011 (8 pages).

*Primary Examiner* — Timothy J. Kugel
(74) *Attorney, Agent, or Firm* — Osha • Liang LLP

(57) ABSTRACT

A wellbore fluid that includes an oleaginous base fluid; and a silanated weighting agent is disclosed. In particular, the silanated weighting agents may be produced by reaction between an alkyl alkoxy silane and a weighting agent Methods of formulating such fluids and methods of drilling using such fluids are also disclosed.

20 Claims, No Drawings

EMULSIFIER FREE OIL-BASED WELLBORE FLUID

BACKGROUND OF INVENTION

1. Field of the Invention

Embodiments disclosed herein relate generally to oil-based wellbore fluids and methods of using such fluids. In particular, embodiments disclosed herein relate generally to oil-based fluids being emulsifier-free.

2. Background Art

During the drilling of a wellbore, various fluids are typically used in the well for a variety of functions. The fluids may be circulated through a drill pipe and drill bit into the wellbore, and then may subsequently flow upward through wellbore to the surface. During this circulation, the drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

In most rotary drilling procedures the drilling fluid takes the form of a "mud," i.e., a liquid having solids suspended therein. The solids function to impart desired rheological properties to the drilling fluid and also to increase the density thereof in order to provide a suitable hydrostatic pressure at the bottom of the well. The drilling mud may be either a water-based or an oil-based mud.

The selection of the type of drilling fluid to be used in a drilling application involves a careful balance of both the good and bad characteristics of the drilling fluids in the particular application and the type of well to be drilled. The primary benefits of selecting an oil-based drilling fluid, also known as an oil-based mud, include: hole stability, especially in shale formations, formation of a thinner filter cake than the filter cake achieved with a water-based mud, excellent lubrication of the drilling string and downhole tools, and penetration of salt beds without sloughing or enlargement of the hole, as well as other benefits that should be known to one of skill in the art. Despite the many benefits of using oil-based muds, they have some disadvantages, including high initial and operational costs as well as environmental concerns.

Oil-based muds typically contain some water, either from the formulation of the drilling fluid itself, or water may be intentionally added to affect the properties of the drilling fluid or mud. In such water-in-oil type emulsions, also known as invert emulsions, an emulsifier is used to stabilize the emulsion. In general, the invert emulsion may contain both water soluble and oil soluble emulsifying agents. Typical examples of such emulsifiers include polyvalent metal soaps, fatty acids and fatty acid soaps, and other similar suitable compounds that should be known to one of ordinary skill in the art.

Emulsifiers and oil wetting agents are added to conventional oil-based muds to emulsify the water phase in the oil phase and to ensure that all of the solids in the mud are wetted by the oil. Specifically, weighting agents, an essential component of oil-based muds, must remain oil wet. The necessity for such weighting agents (typically barite) to be oil-wet is because when water-wet, this material agglomerates and rapidly sediments out of the fluid. When such sedimentation occurs, it can be difficult to maintain a constant mud weight, the consequence of which could be a severe well control problem.

However, the majority of formations drilled are naturally water-wet but when contacted by the emulsifiers present in oil-based muds are easily changed to oil-wet. Such alteration in the wettability of the formation can reduce the permeability of the formation to oil and, in addition, increase oil retention on cuttings, leading to increased disposal considerations. Disposal of oil-wet cuttings is particularly a concern when cuttings include water-wet shale, which are frequently drilled with an oil-based fluid to avoid complications such as bit balling when drilling with a water-based fluid. When drilling with an oil-based fluid through shale, oil-wetting surfactants can cause penetration of oil into the pores of the shale (particularly along places of weakness), causing dispersion of the cuttings into fine particles. The surfactant-induced dispersion leads to a build up of undesirable "low gravity solids" and high viscosity, the only remedy for which is to dilute the mud with additional quantities of oil (increasing waste volume and costs associated with cleaning the fluids for disposal).

The ability to eliminate such emulsifiers would allow cuttings and reservoir formations drilled using oil-based muds to remain in their natural, water-wet state. This would lead to both lower oil retention on cuttings and to smaller reductions in permeability. Thus, while the presence of emulsifiers and other oil wetting agents have been considered to be essential components of conventional oil-based muds, the presence of such materials can alter the wettability of reservoir formations thereby reducing their permeability to oil and increasing oil retention. Accordingly, there exists a continuing need for oil-based wellbore fluids that are emulsifier-free.

SUMMARY OF INVENTION

In one aspect, embodiments disclosed herein relate to a wellbore fluid that includes an oleaginous base fluid; and a silanated weighting agent.

In another aspect, embodiments disclosed herein relate to a method of drilling a subterranean hole with an oil-based drilling fluid that includes mixing an oleaginous base fluid with a silanated weighting agent to form the oil-based drilling fluid; and drilling the subterranean hole using oil-based drilling fluid.

In yet another aspect, embodiments disclosed relate to a method of formulating an oil-based wellbore fluid that includes adding at least one alkyl alkoxy silane or alkyl alkoxy siloxane to an oleaginous fluid; adding a quantity of water sufficient to initiate hydrolysis of the at least one alkyl alkoxy silane or alkyl alkoxy siloxane; adding at least one weighting agent material having reactive hydroxyl groups; and allowing a chemical reaction between the alkyl alkoxy silane or alkyl alkoxy siloxane and the at least one weighting agent material to occur to form a silanated weighting agent mixed the oleaginous base fluid.

Other aspects and advantages of the invention will be apparent from the following description and the appended claims.

DETAILED DESCRIPTION

Embodiments disclosed herein are directed to oil-based fluids being emulsifier-free. As discussed above, while conventional oil-based wellbore fluids present many benefit, the necessary incorporation of an emulsifier does present some operational and environmental concerns. Thus, in accordance with embodiments of the present disclosure, an oil-based wellbore fluid being emulsifier-free may reduce or minimize those some of those concerns. As used herein, the term "emulsifier-free" refers to a fluid having substantially no emulsifying compounds dispersed freely through the fluid. Rather, in accordance with embodiments of the present disclosure, weighting agent materials may be chemically modified to give the particles a lipophilic, oil-wetting character. As used herein, "chemical modification" refers to chemical reaction forming covalent bonds between the weighting agent materials and at least one lipophilic compound so that the lipophilic components are not able to be freely dispersed within the fluid. Further, the covalent bonds may substantially prevent the lipophilic components from relocating to other surfaces, including cuttings, the formation, etc.

So that lipophilic components may be covalently bound to the weighing agent materials, the weighting agent materials of the present disclosure may include any ore material capable of chemical reaction, i.e., having a reactive hydroxyl group, such as oxides, carbonates, silicates, etc. of various metals and/or alkaline earth metals including, for example, calcium, barium, magnesium, iron, strontium, aluminum, and/or zinc, may be used. Further, while many alkali salts, such as sodium are fairly soluble, others, such as sodium aluminosilicate and/or sodium magnesium aluminosilicate, are fairly insoluble and thus may be used as alternative weighting agents in the fluids of the present disclosure. In particular embodiments, the weighting agents coated as disclosed herein may include such materials including, for example, calcium carbonate (calcite), magnesium carbonate (magnesite), calcium magnesium carbonate (dolomite), iron oxide (hematite), iron carbonate (siderite), manganese tetraoxide (haussmanite), manganese dioxide (pyrolusite), iron titanium oxide (ilmenite), magnesium iron silicate (olivine), etc.

One having ordinary skill in the art would recognize that selection of a particular material may depend largely on the density of the material, as typically, the lowest wellbore fluid viscosity at any particular density is obtained by using the highest density particles. However, other considerations may influence the choice of product such as cost, local availability, the power required for grinding, and whether the residual solids or filter cake may be readily removed from the well.

In some embodiments, the weighting agent may be formed of particles that are composed of a material of specific gravity of at least 1.8; at least 2.4 in other embodiments; at least 2.68 in yet other embodiments; at least 3.0 in yet other embodiments. Further, one skilled in the art would appreciate that other specific gravity materials may be used, and that use of such materials may depend on the cost (depending on desired fluids density), availability of materials, and amount needed to weight up a fluid to the desired density. For example, a weighting agent formed of particles having a specific gravity of at least 2.68 may allow wellbore fluids to be formulated to meet most density requirements yet have a particulate volume fraction low enough for the fluid to be pumpable. Further, one skilled in the art would appreciate that the desired fluid density may depend on the pressure requirements of the wellbore in which the fluid will be used. For example, to formulate a fluid suitable for high pressure wellbore, sufficient amounts of weighting agents may be added to result in a wellbore fluid density greater than 15 ppg. However, in other embodiments, the fluid formulation density may range from 15-20 ppg.

In one embodiment, the weighting agent may be micronized, having a $d_{90}$ less than 25 microns, and less than 10 or 8 microns in other embodiments. In a particular embodiment, the micronized weighting agent may have a $d_{90}$ ranging from 1 to 25 microns and a $d_{50}$ ranging from 0.5 to 10 microns. In another embodiment, the micronized weighting agent includes particles having a $d_{90}$ ranging from 2 to 8 microns and a $d_{50}$ ranging from 0.5 to 5 microns. In a particular embodiment, the use of such fine particles may result in a product that is more resistant to attrition (exposing non-oil-wet surfaces) by the force of inter-particle collisions than one based on conventional API grade particles. It may also allow for the use of finer screen or more intense centrifugation to remove drill cuttings more efficiently from fluids circulated through the wellbore, without substantial co-removal of the weighting agents that may occur with the use of large particle sizes.

The fine particle size will generate suspensions or slurries that may show a reduced tendency to sediment or sag, and the lipophilic coating on the surface of the particle may control the inter-particle interactions and thus will produce lower rheological profiles. It is the combination of fine particle size and control of colloidal interactions that reconciles the two objectives of lower viscosity and minimal sag. Further, one of ordinary skill in the art would recognize that the weighting agent may have a particle size distribution other than a monomodal distribution. That is, the weighting agent may have a particle size distribution that, in various embodiments, may be monomodal, which may or may not be Gaussian, bimodal, or polymodal.

Further, while micronized particles are describe above, such micron size ranges is not intended to be a limitation on the scope of the present disclosure. Rather, it is also within the scope of the present disclosure that the weighting agent may include larger particles, including, for example, weighting agent materials may have a $d_{90}$ greater than 25 microns in some embodiments, and greater than 45 or 70 microns in yet other embodiments. In a particular embodiment, a larger weighting agent may include particles having a $d_{90}$ ranging from 30 to 80 microns and a $d_{50}$ ranging from 10 to 30 microns. In another embodiment, the larger weighting agent may include particles having a $d_{90}$ ranging from 30 to 40 microns and a $d_{50}$ ranging from 10 to 16 microns. In yet another embodiment, the larger weighting agent may include particles having a $d_{90}$ ranging from 40 to 60 microns and a $d_{50}$ ranging from 12 to 25 microns. In yet another embodiment, the larger weighting agent may include particles having a $d_{90}$ ranging from 60 to 80 microns and a $d_{50}$ ranging from 16 to 30 microns.

As described above, to render the weighting agents oil-wetting, they may be reacted with an alkyl alkoxy silane or an alkyl alkoxy siloxane, such that the alkoxy groups of the silane/siloxane react with hydroxy functional groups on the weighting materials substrate, releasing an alkanol. Alkoxy alkyl silanes my have the general formula $R^1{}_{4-n}Si(OR^2)_n$, where each $R^1$ is individually selected from an alkyl group with 1 to 18 carbons, preferably 8 to 16 carbons, $R^2$ is an alkyl group with 1 to 5 carbons, preferably 2-4 carbons; and n is 1-3. Alkyl alkoxy siloxanes may have the general formula $(CH_3)_x R^3{}_y$—$Si(OR^2)_z(O)_{(4-x-y-z)/2}$, in which $R^2$ is an alkyl group with 1 to 5 carbons, preferably 2-4 carbons, $R^3$ is an alkyl group with 3 to 18 C atoms, x+y has a value of 0.75 to 1.5, wherein y has a value greater than 0.1 and z has a value of 0.2 to 2.0. Thus, as upon reaction with the weighting material, an alkanol is released, one skilled in the art would appreciate that selection of the alkyl alkoxy silane/siloxane may be partially dependent upon reactivity and the alkanol by-product, and its potential effects on the wellbore fluids disclosed herein. Additionally, selection of an alkyl group may be based on the desired lipophilicity of the reagents, and their ability to render the weighting agents oil-wet. The alkyl alkoxy silanes of the above formulas are known products. Examples of the corresponding alkyl group are the butyl, hexyl, octyl, nonyl, decyl, dodecyl, tetradecyl, hexadecyl and octadecyl radicals while the alkoxy groups may be composed of ethoxy, propoxy, isopropoxy, and butoxy. Alternatively, alkyl trichlorosilanes may be used, where the alkyl group may be selected, for example, from butyl, hexyl, octyl, nonyl, decyl, octadecyl, and dodecyl.

In a particular embodiment, the weighting agnet materials may be chemically modified by reaction with at least one silane selected from octyl triethoxy silane, decyl triethoxy silane, dodecyl triethoxy silane, tetradecyl triethoxy silane, hexadecyl triethoxy silane, or octadecyl triethoxy silane. Additionally, mixtures of these silanes (as well as the silanes/siloxanes describe above) may also be used. Further, in combining a silane or siloxane with a weighting agent material for chemical modification of the weighting agent material, an amount ranging from 0.1 to 5 weight percent of the weighting agent may be suitable. However, one skilled in the art would appreciate that other amounts may be used, for example, depending on the particular silane or siloxane selected.

Chemical modification of the weighting agent materials may occur by adding the selected silane(s)/siloxane(s) a base oil or solvent, initiating hydrolysis of the components by the addition of a slight amount of water, and then addition of the selected weighting material having reactive hydroxy groups on the surface thereof. Further, depending on the amount of time having passed prior to the addition of the weighting agent materials, one skilled in the art would appreciate that some level of silanol condensation (forming siloxane bonds) may have occurred prior to the addition of the weighting agent material. Further, as chemical reaction between the weighting agent materials and silane components may be preceded by hydrogen bonding, it may be desirable to heat the mixture (such as by curing or drying) so as to form covalently bond the silane to the weighting agent materials, thereby forming an immobile lipophilic layer on the weighting agents, rendering the materials oil-wet. Further, the chemically modified weighting agents may be dried or left in solvent prior to incorporation into a wellbore fluid.

Thus, the particulate materials as described herein (i.e., the coated weighting agents) may be added to a wellbore fluid as a weighting agent in a dry form or concentrated as slurry in an organic liquid. As is known, an organic liquid should have the necessary environmental characteristics required for additives to oil-based drilling fluids. With this in mind, the oleaginous fluid may have a kinematic viscosity of less than 10 centistokes (10 $mm^2$/s) at 40° C. and, for safety reasons, a flash point of greater than 60° C. Suitable oleaginous liquids are, for example, diesel oil, mineral or white oils, n-alkanes or synthetic oils such as alpha-olefin oils, ester oils, mixtures of these fluids, as well as other similar fluids known to one of skill in the art of drilling or other wellbore fluid formulation. In one embodiment, the desired particle size distribution is achieved via wet milling of the courser materials in the desired carrier fluid.

Given the particulate nature of the weighting agents disclosed herein, one of skill in the art should appreciate that additional components may be mixed with the weighting agent to modify various macroscopic properties. Other additives that may be included in the wellbore fluids disclosed herein include for example, viscosifiers, bridging agents, fluid loss control agents, pH buffers, mutual solvents, thinners, thinning agents and cleaning agents. The addition of such agents should be well known to one of ordinary skill in the art of formulating drilling fluids and muds.

For example, anti-caking agents, lubricating agents, and agents used to mitigate moisture build-up may be included. Alternatively, solid materials that enhance lubricity or help control fluid loss may be added to the weighting agents and drilling fluid disclosed herein. In one illustrative example, finely powdered natural graphite, petroleum coke, graphitized carbon, or mixtures of these are added to enhance lubricity, rate of penetration, and fluid loss as well as other properties of the drilling fluid. For example, less than 5 percent by weight of suitably sized graphite and petroleum coke are added to enhance the lubricity and fluid loss properties of the fluid. Finally, in another illustrative embodiment, less than 5 percent by weight of a conventional anti-caking agent is added to assist in the bulk storage of the weighting materials.

Another illustrative embodiment uses at least one synthetic polymer to impart various viscosifying and/or fluids loss control characteristics to the wellbore fluid. In instances where such materials are added, it is important to note that the volume of added material should not have a substantial adverse impact on the properties and performance of the drilling fluids. In one illustrative embodiment, polymeric materials comprising less than 5 percent by weight are added to enhance the properties of the wellbore fluid. However, selection of the viscosifier may be based, in part, on the requirements and behavior of the viscosifier. For example, organophilic clays, which are typically used as viscosifiers in oil-based fluids, may not be the most desirable viscosifier in some embodiments, due to the tendancy for such clay materials to, when in contact, attract water. Thus, in particular embodiments, a viscosifier may be selected that is neither reliant upon (i.e., for gellation) or hindered by the presence of water. Thus, in a particular embodiment, at least one synthetic polymer may be used to viscosify the fluids of the present disclosure.

Some synthetic polymer and oligomer additives such as poly(ethylene glycol)(PEG), poly(diallyl amine), poly(acrylamide), poly(aminomethylpropylsulfonate[AMPS]), poly(acrylonitrile), poly(vinyl acetate), poly(vinyl alcohol), poly(vinyl amine), poly(vinyl sulfonate), poly(styryl sulfonate), poly(acrylate), poly(methyl acrylate), poly(methacrylate), poly(methyl methacrylate), poly(vinylpyrrolidone), poly(vinyl lactam), and co-, ter-, and quater-polymers of the following co-monomers: ethylene, butadiene, isoprene, styrene, divinylbenzene, divinyl amine, 1,4-pentadiene-3-one (divinyl ketone), 1,6-heptadiene-4-one (diallyl ketone), diallyl amine, ethylene glycol, acrylamide, AMPS, acrylonitrile, vinyl acetate, vinyl alcohol, vinyl amine, vinyl sulfonate, styryl sulfonate, acrylate, methyl acrylate, methacrylate, methyl methacrylate, vinylpyrrolidone, and vinyl lactam are often used as viscosifiers. Particular examples of viscosifiers that may be suitable for use in the present disclosure are a butadiene-styrene copolymer, a styrene-acrylate copolymer, and/or a polyamide (such as CRAYVALLAC® EXTRA or CRAYVALLAC® SL available from Cray Valley (Paris, France)). Additionally, depending on the particular viscosifier selected, it may also be desirable to include other additives known in the art for fluid loss control purposes. Further, depending the form in which the viscosifier is provided (for example, solid particles such as the CRAYVALLAC® products), it may be desirable to incorporate the viscosifier into a co-solvent (such as a synthetic polyalphaolefin) for substantially homogenous dispersion of the viscosifier into the fluid with minimal agglomeration. In a particular embodiment, a polyamide viscosifier may be incorporated into a synthetic polyalphaolefin hydraulic oil.

Fluid loss control agents typically act by coating the walls of the borehole as the well is being drilled. Suitable fluid loss control agents which may find utility in this invention include modified lignites, asphaltic compounds, gilsonite, organophilic humates prepared by reacting humic acid with amides or polyalkylene polyamines, and other non-toxic fluid loss additives. Typically, fluid loss control agents are added in amounts less than about 10% and preferably less than about 5% by weight of the fluid.

Bridging agents, as known in the art, may also be used bridge across the pore throats or fractures of an exposed rock thereby building a filter cake to prevent loss of whole mud or excessive filtrate. Such typically bridging agents may include materials such as calcium carbonate, sized salt, oil-soluble resins, graphite, mica, nutshells, and fibers, etc. Typically, bridging agents are added in amounts ranging from 1 to 10 percent by weight of the fluid.

Further, by using the chemically modified weighting agent materials of the present disclosure, there is no need to add conventional emulsifiers or wetting agents to oil-based fluids. Rather, a fluid that is substantially water-free may be readily formulated. Any water contamination of the fluid by surface or formation water will not be strongly emulsified into the fluid, however, and thus water contamination may be easily removed from collected fluid at the surface using conventional separation techniques, such as, for example, by centrifugation.

Further, it is also within the scope of the present disclosure that water be "removed" from the fluid system while in the wellbore. In such embodiments, a water-scavenger may be preemptively incorporated in the oil-based wellbore fluid to reduce the effect of any water influx. Such water scavengers may include various inorganic salts known to those skilled in the art whereby such contaminating water may be complexed by the salts. Alternatively, a water-absorbing polymer may be used, such as crosslinked polyacrylamide, polyacrylate, or copolymers thereof. Particularly, the water absorbing polymer may include a copolymer of polyacrylamide, that may be crosslinked via internally amide groups or an additional crosslinking agent, two strands of sodium polyacrylate crosslinked with bis(acrylamide).

In other embodiments, the water absorbing polymer may include carboxylate containing polymers such as polyacrylates, polyaspartates, and polylacetates, sulfonate containing polymers, quaternary or cationic amine containing polymers such as polyallylamine or polyethyleneimine, and polyacrylamide, polyvinyl alcohol gels, and polyurethane gels. Water absorbing polymers and the process for making such polymers suitable for embodiments of the present disclosure, include those described in U.S. Pat. Nos. 4,618,631, 4,698,404, 4,755,560, 6,222,091, 6,376,072, and 6,750,262, which are herein incorporated by reference in their entirety. Some of these various water absorbing polymers have had specific application in the disposable diaper and agricultural water retention industries because of their ability absorb up to 400 times their weight in water.

The absorbance capacity of the water absorbing polymers may be explained by the matrix-like structure of dry water absorbing polymer particle. The dry polymer may contain charged species within the matrix, such that the ionization of the polymer will cause the matrix network to open and create cavities that may absorb water by capillary action. Water absorbed into the polymer may be retained by hydrogen bonds that form between the charged species and the water. The actual mechanism for water absorbance and retention may vary based on the structure of a particular water absorbing polymer. For example, sodium polyacrylate, in the dry powdered state, contains a coiled backbone, lined with carboxyl groups. When exposed to an aqueous solution, the carboxyl groups dissociate into negatively charged carboxylate ions, which may repel one another along the polymer chain.

The repelling carboxylate ions thereby widen the polymer coils and allow water to move into contact with inner carboxyl groups, further continuing the widening or swelling of the polymer. Water is retained within the polymer due to hydrogen bonding between the water and the carboxylate ions on the polymer. Polyacrylamide, another water absorbing polymer, is structurally similar to polyacrylate but substitutes amide groups for the carboxyl groups on the polymer backbone. Free, unlinked amide groups, because they contain —$NH_2$ groups, can form hydrogen bonds with water. Further, because of the crosslinking that exists in these water absorbing polymers, the water absorbing polymers remain insoluble in an aqueous solution.

In specific embodiments, fluids of the present disclosure may employ POLYSWELL™, available from M-I LLC, which is an anionic acrylamide based copolymer formulation, as the water-scavenging, water absorbing polymer component of fluids disclosed herein.

Further, one of ordinary skill in the art would appreciate that such water scavengers may be removed from a fluid at the surface with the use of a screen. Fresh polymers may be added to the fluid prior to pumping the fluid back downhole.

The particles described above may be used in any wellbore fluid such as drilling, completion, packing, work-over (repairing), stimulation, well killing, spacer fluids, and other uses of high density fluids. Such alternative uses, as well as other uses, of the present fluid should be apparent to one of skill in the art given the present disclosure. In accordance with one embodiment, the weighting agents may be used in an oil-based wellbore fluid formulation substantially free of water and emulsifiers.

The oleaginous fluid used for formulating oil-based fluids used in the practice of the present disclosure are liquids and are more preferably a natural or synthetic oil and more preferably, the oleaginous fluid is selected from the group including diesel oil, mineral oil, synthetic oils such as ester based synthetic oils, polyolefin based synthetic oils (i.e., saturated and unsaturated polyalpha olefin, saturated and unsaturated long chain internal olefins), polydiorganosiloxanes, siloxanes or organo-siloxanes, and mixtures thereof and similar compounds that should be known to one of skill in the art.

Conventional methods may be used to prepare the drilling fluids disclosed herein in a manner analogous to those normally used, to prepare conventional oil-based wellbore fluids. In one embodiment, a desired quantity of oil-based fluid and suitable amounts of weighting agents are mixed together and the remaining components of the drilling fluid added sequentially with continuous mixing.

Examples

Various emulsifier-free oil-based fluids were formulated. Specifically, in formulating the fluids, the weighting agent (hematite) was initially modified by adding the particular silane being used to a quantity of base oil, adding the water, and then adding the weighting agent. The remaining components detailed below were then added.

Example 1

An emulsifier-free oil-based fluid was formulated using the components listed below in Table 1. The fluid in this example used a C16-C18 internal olefin as the base oil. Additionally, of the components listed below, CC-550 is a styrene based polymer available from Creole Chemicals (Kingwood, Tex.), XPR-082 is a styrene-acrylate co-polymer available from Eliokem, Inc. (Akron, Ohio), C-SEAL™ is a industrial carbon blend available from M-I LLC (Houston, Tex.), VINSEAL® is a cellulosic material available from M-I LLC (Houston, Tex.), and SAFECARB™ is a calcium carbonate bridging agent.

TABLE 1

| Sample 1 Components | Amount (lb/bbl) |
|---|---|
| IO 16-18 | 214 |
| Hematite | 261 |
| Octyltriethoxy silane | 1.1 |
| water | 0.1 |
| CC-550 | 5 |
| XPR-082 | 2 |
| C-SEAL ™ | 10 |
| VINSEAL ® | 10 |
| SAFECARB ™ 20 | 10 |
| Rev. Dust | 15 |

The fluid was heat aged for 16 hours at 250° F., the rheological properties of the heat-aged fluid was measured at 120° F. and 150° F. using a Fann 35 Viscometer, available from Farm Instrument Company. Fluid loss was measured with a saturated API high temperature, high pressure (HTHP) cell.

TABLE 2

| Sample 1 After Heat Aging at 250° F. | | |
|---|---|---|
| Rheology Temp | 120° F. | 150° F. |
| 600 | 84 | 71 |
| 300 | 49 | 42 |
| 200 | 37 | 32 |
| 100 | 23 | 20 |
| 6 | 9 | 7 |
| 3 | 7 | 6 |
| 10 s | 6 | 5 |
| 10 m | 10 | 9 |
| PV | 35 | 29 |
| YP | 14 | 13 |
| HTHP fluid loss at 250 F. | 6.0 ml | — |

Example 2

Another example fluid was formulated as shown below in Table 3.

TABLE 3

| Sample 2 Components | Amount (lb/bbl) |
|---|---|
| IO 16-18 | 214 |
| Hematite | 261 |
| Octyltriethoxy silane | 1.1 |
| water | 0.1 |
| CC-550 | 6 |
| C-SEAL ™ | 10 |
| VINSEAL ® | 10 |
| SAFECARB ™ 20 | 10 |
| Rev. Dust | 15 |

The fluid was heat aged for 16 hours at 250° F., the rheological properties of the heat-aged fluid was measured at various temperatures, shown below in Table 4.

TABLE 4

| Sample 2 After Heat Aging at 250° F. | | | | |
|---|---|---|---|---|
| Rheology Temp | 40 F. | 76 F. | 120 F. | 150 F. |
| 600 | 174 | 120 | 74 | 60 |
| 300 | 92 | 65 | 41 | 34 |
| 200 | 63 | 45 | 29 | 24 |
| 100 | 34 | 25 | 13 | 14 |
| 6 | 3 | 3 | 2 | 2 |
| 3 | 2 | 2 | 1 | 1 |
| 10 s | 3 | 3 | 1 | 2 |
| 10 m | 4 | 3 | 3 | 3 |
| PV | 82 | 55 | 33 | 26 |
| YP | 10 | 10 | 8 | 8 |
| HTHP fluid loss at 250 F. | 8.0 ml | — | — | — |

Example 3

Several fluids were formulated using mineral oil (LVT-200) as the base oil.
The components are shown below in Table 5.

TABLE 5

| Components (lb/bbl) | Sample 3 | Sample 4 | Sample 5 |
|---|---|---|---|
| LVT-200 | 214 | 233 | 233 |
| Hematite | 261 | 265 | 265 |
| Octyltriethoxy silane | 1.1 | 1.1 | 1.1 |
| water | 0.1 | 0.1 | 0.1 |
| CC-550 | 6 | 6.0 | 6.0 |
| C-SEAL ™ | 10 | — | — |
| VINSEAL ® | 10 | — | — |
| SAFECARB ™ 20 | 10 | — | — |
| Rev. Dust | 15 | 15.0 | 15.0 |

The fluid was heat aged for 16 hours at various temperatures, and the rheological properties of the heat-aged fluid was measured at 120° F. shown below in Table 6. Fluid loss for sample 3 was measured using a modified HTHP fluid loss test, with a 30 micron disc as the porous medium.

TABLE 6

| | Sample 3 | Sample 4 | Sample 5 |
|---|---|---|---|
| Heat Aging Temp | 250° F. | 250° F. | 300° F. |
| Rheology Temp | 120° F. | 120 F. | 120 F. |
| 600 | 79 | 80 | 58 |
| 300 | 45 | 50 | 33 |
| 200 | 33 | 39 | 24 |
| 100 | 19 | 26 | 14 |
| 6 | 3 | 10 | 3 |
| 3 | 2 | 9 | 2 |
| 10 s | 2 | 5 | 2 |
| 10 m | 3 | 7 | 3 |
| PV | 34 | 30 | 25 |
| YP | 11 | 20 | 8 |
| HTHP using 35μ disk at 250° F. | 12.0 ml | — | — |
| HTHP at 250° F. | — | 9.0 ml | 10.0 ml |

Example 4

Another fluid was formulated using diesel oil as the base oil. The components are shown below in Table 7. VERSAPAC® is a thermally activated gelling agent available from M-I LLC (Houston, Tex.).

TABLE 7

| Components (lb/bbl) | Sample 6 |
|---|---|
| LVT-200 | 246 |
| Hematite | 145 |

TABLE 7-continued

| Components (lb/bbl) | Sample 6 |
|---|---|
| Octyltriethoxy silane | 1.1 |
| water | 0.1 |
| CC-550 | 6.0 |
| VERSAPAC ® | 1.0 |
| Rev. Dust | 15.0 |

The fluid was heat aged for 16 hours at 250° F., the rheological properties of the heat-aged fluid was measured at 120° F., shown below in Table 8

TABLE 8

| Sample 6 After Heat Aging at 250° F. | |
|---|---|
| Rheology Temp | 120 F. |
| 600 | 128 |
| 300 | 78 |
| 200 | 59 |
| 100 | 38 |
| 6 | 11 |
| 3 | 9 |
| 10 s | 8 |
| 10 m | 11 |
| PV | 50 |
| YP | 28 |
| HTHP fluid loss at 250 F. | 8.0 ml |

Example 5

Fluids (9.5 ppb and 12.5 ppb) were also formulated using polyamide viscosifiers. The components are shown below in Table 9. CRAYVALLAC® SL and CRAYVALLAC® EXTRA are polyamides available from Cray Valley (Paris, France) and AWH-ISO-32 is a synthetic PAO hydraulic oil available from Amsoil (Superior, Wis.).

TABLE 9

| Components (lb/bbl) | Sample 7 | Sample 8 |
|---|---|---|
| Diesel | 260 | — |
| IO16-18 | — | 218 |
| Hematite | 130 | 296 |
| Octyltriethoxy silane | 1.1 | 1.25 |
| water | 0.1 | 0.1 |
| CC-550 | 6.0 | 5 |
| CRAYVALLAC ® SL | 2.0 | — |
| CRAYVALLAC ® EXTRA | — | 1.5 |
| AWH-ISO-32 | 2.5 | 2.5 |

The fluid was heat aged for 16 hours at 250° F., and the rheological properties of the heat-aged fluid was measured at 150° F. shown below in Table 10.

TABLE 10

| | Sample 7 | Sample 8 |
|---|---|---|
| Heat Aging Temp | 250° F. | 250° F. |
| Rheology Temp | 150° F. | 150 F. |
| 600 | 54 | 71 |
| 300 | 33 | 44 |
| 200 | 24 | 34 |
| 100 | 16 | 23 |
| 6 | 4 | 9 |
| 3 | 3 | 8 |
| 10 s | 3 | 9 |
| 10 m | 5 | 12 |
| PV | 21 | 27 |

TABLE 10-continued

| | Sample 7 | Sample 8 |
|---|---|---|
| YP | 12 | 17 |
| HTHP at 250° F. | 7 mL | — |

Advantageously, embodiments of the present disclosure for an oil-based fluid free of emulsifiers conventionally necessary in formulating oil-based fluids. While an emulsifier is conventionally necessary to convert weighting agents (necessary to weight up a fluid) to oil-wet to prevent the particles from settling out of solution, the emulsifier often has deleterious environmental effects. Thus, by using an oil-based fluid formulated without an emulsifier, many issues associated with the use of conventional oil-based fluids may be overcome. Specifically, formation damage to due wettability changes or emulsion blocking, poor cement bonding, surfactant-induced dispersion of drill cuttings, inability to separate water contamination, poor rheological properties and stability at high temperatures, difficulty in washing cuttings, can all be overcome or minimized with the use of the emulsifier-free wellbore fluids of the present disclosure. Additionally, a water-free fluid may be particularly desirable when drilling through highly water-sensitive shales, to reduce incidents of bit balling and dispersion of shale cuttings into fine particles, which can limit the reuse of a fluid, and pose additional waste volumes.

Further, as compared to typical drilling fluids, embodiments of the wellbore fluids disclosed herein may allow for greater rates of penetration when drilling to be achieved, while at the same time having one or more of: an equivalent or lower sag, an equivalent or lower settling rate, an equivalent density (weight), and better rheological properties.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A wellbore fluid, comprising:
   an oleaginous base fluid; and
   a silanated weighting agent, wherein the silanated weighting agent is produced by the reaction between an alkyl alkoxy silane and a weighting agent, wherein the weighting agent comprises an ore material having reactive hydroxyl groups and/or comprises at least one of oxides, carbonates and/or silicates of calcium, barium, magnesium, iron, strontium, aluminum, and/or zinc.

2. The wellbore fluid of claim 1, further comprising:
   at least one viscosifier.

3. The wellbore fluid of claim 2, the viscosifier comprising a copolymer of the following comonomers: ethylene, butadiene, isoprene, styrene, divinylbenzene, divinyl amine, 1,4-pentadiene-3-one, 1,6-heptadiene-4-one, diallyl amine, ethylene glycol, acrylamide, 2-acrylamido-2-methyl propane sulfonate, acrylonitrile, vinyl acetate, vinyl alcohol, vinyl amine, vinyl sulfonate, styryl sulfonate, acrylate, methyl acrylate, methacrylate, methyl methacrylate, vinylpyrrolidone, and vinyl lactam.

4. The wellbore fluid of claim 2, wherein the viscosifier comprises at least one of a butadiene-styrene or styrene-acrylate copolymer.

5. The wellbore fluid of claim 2, wherein the viscosifier comprises a polyamide.

6. The wellbore fluid of claim 2, further comprising a synthetic polyalphaolefin hydraulic oil as a cosolvent for the viscosifier.

7. The wellbore fluid of claim 1, further comprising:
at least one water scavenger.

8. The wellbore fluid of claim 7, wherein the water scavenger comprises crosslinked polyacrylamide, polyacrylate, or copolymers thereof.

9. The wellbore fluid of claim 1, wherein the alkyl alkoxy silane comprises at least one of octyl triethoxy silane, decyl triethoxy silane, dodecyl triethoxy silane, tetradecyl triethoxy silane, hexadecyl triethoxy silane, or octadecyl triethoxy silane.

10. A method of drilling a subterranean hole with an oil-based drilling fluid, comprising:
mixing an oleaginous base fluid with a silanated weighting agent to form the oil-based drilling fluid, wherein the silanated weighting agent is produced by the reaction between an alkyl alkoxy silane and a weighting agent, wherein the weighting agent comprises an ore material having reactive hydroxyl groups, and/or comprises at least one of oxides, carbonates and/or silicates of calcium, barium, magnesium, iron, strontium, aluminum, and/or zinc; and
drilling the subterranean hole using the oil-based drilling fluid.

11. The method of claim 10, wherein the oil-based drilling fluid further comprises a polyamide viscosifier.

12. The method of claim 11, further comprising:
mixing the polyamide viscosifier incorporated into a synthetic polyalphaolefin hydraulic oil into the oil-based drilling fluid.

13. The method of claim 10, wherein the alkyl alkoxy silane comprises at least one of octyl triethoxy silane, decyl triethoxy silane, dodecyl triethoxy silane, tetradecyl triethoxy silane, hexadecyl triethoxy silane, or octadecyl triethoxy silane.

14. The method of claim 10, further comprising:
mixing in the oil-based drilling fluid at least one viscosifier comprising a copolymer of the following comonomers: ethylene, butadiene, isoprene, styrene, divinylbenzene, divinyl amine, 1,4-pentadiene-3-one, 1,6-heptadiene-4-one, diallyl amine, ethylene glycol, acrylamide, 2-acrylamido-2-methyl propane sulfonate, acrylonitrile, vinyl acetate, vinyl alcohol, vinyl amine, vinyl sulfonate, styryl sulfonate, acrylate, methyl acrylate, methacrylate, methyl methacrylate, vinylpyrrolidone, and vinyl lactam.

15. The method of claim 10, wherein the oil-based drilling fluid further comprises at least one water scavenger comprising crosslinked polyacrylamide, polyacrylate, or copolymers thereof.

16. A method of formulating an oil-based wellbore fluid, comprising:
adding at least one alkyl alkoxy silane or alkyl alkoxy siloxane to an oleaginous fluid;
adding a quantity of water sufficient to initiate hydrolysis of the at least one alkyl alkoxy silane or alkyl alkoxy siloxane;
adding at least one weighting agent material having reactive hydroxyl groups; and
allowing a chemical reaction between the alkyl alkoxy silane or alkyl alkoxy siloxane and the at least one weighting agent material to occur to form a silanated weighting agent mixed in the oleaginous base fluid.

17. The method of claim 16, wherein the alkyl alkoxy silane comprises at least one of octyl triethoxy silane, decyl triethoxy silane, dodecyl triethoxy silane, tetradecyl triethoxy silane, hexadecyl triethoxy silane, or octadecyl triethoxy silane.

18. The method of claim 16, wherein the weighting agent comprises at least one of oxides, carbonates and/or silicates of calcium, barium, magnesium, iron, strontium, aluminum, and/or zinc.

19. The method of claim 16, further comprising:
adding at least one of a viscosifier or water-scavenger to the mixture after the silanated weighting agent has been formed.

20. The method of claim 16, further comprising:
adding an additional volume of oleaginous base fluid to the mixture after the silanated weighting agent has been formed.

* * * * *